(12) United States Patent
Morinaga et al.

(10) Patent No.: US 8,207,708 B2
(45) Date of Patent: Jun. 26, 2012

(54) POWER GENERATION CONTROL METHOD OF HYBRID CONSTRUCTION MACHINE AND HYBRID CONSTRUCTION MACHINE

(75) Inventors: Jun Morinaga, Hiratsuka (JP); Tadashi Kawaguchi, Hiratsuka (JP); Hiroaki Inoue, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 420 days.

(21) Appl. No.: 12/450,344

(22) PCT Filed: Mar. 21, 2008

(86) PCT No.: PCT/JP2008/055264
§ 371 (c)(1),
(2), (4) Date: Sep. 22, 2009

(87) PCT Pub. No.: WO2008/117748
PCT Pub. Date: Oct. 2, 2008

(65) Prior Publication Data
US 2010/0097037 A1    Apr. 22, 2010

(30) Foreign Application Priority Data

Mar. 23, 2007 (JP) ................................. 2007-077667

(51) Int. Cl.
*H02P 9/04* (2006.01)
*H02P 11/00* (2006.01)
*H02J 7/14* (2006.01)
*H02J 7/00* (2006.01)
*F16D 31/02* (2006.01)

(52) U.S. Cl. .............. 322/14; 322/15; 322/16; 320/104; 320/132; 60/414; 37/348

(58) Field of Classification Search .................... 322/14, 322/15, 16; 320/104, 132; 60/414; 37/348
See application file for complete search history.

(56) References Cited

U.S. PATENT DOCUMENTS

| 3,659,968 | A | * | 5/1972 | Thomas et al. ............... 417/417 |
| 5,929,595 | A | | 7/1999 | Lyons et al. |
| 6,635,973 | B1 | * | 10/2003 | Kagoshima et al. ......... 307/10.1 |
| 6,725,581 | B2 | * | 4/2004 | Naruse et al. ................... 37/348 |
| 6,864,663 | B2 | * | 3/2005 | Komiyama et al. ........... 320/104 |

(Continued)

FOREIGN PATENT DOCUMENTS

JP    8-47109    2/1996

(Continued)

OTHER PUBLICATIONS

International Search Report issued in PCT/JP2008/055264, dated Apr. 22, 2008.

(Continued)

*Primary Examiner* — Pedro J Cuevas
(74) *Attorney, Agent, or Firm* — Edwards Wildman Palmer LLP

(57) ABSTRACT

A power generation control method of a hybrid construction machine capable of maintaining voltage of a capacitor in an appropriate range while minimizing capacitance of the capacitor and of surely preventing a system from being rendered inoperative, and the hybrid construction machine are provided. For this purpose, swing power corresponding to electric power consumed by a swing motor for swinging a part of a body relative to other parts is sequentially calculated, a value of the calculated swing power is converted to a smaller value, a power generation command of a generator motor is sequentially generated using the converted value, and the generated power generation command is output to an inverter for driving the generator motor.

7 Claims, 10 Drawing Sheets

U.S. PATENT DOCUMENTS

| | | | |
|---|---|---|---|
| 7,086,226 B2 * | 8/2006 | Oguri | 60/414 |
| 7,249,457 B2 * | 7/2007 | Raszga et al. | 60/419 |
| 7,562,472 B2 * | 7/2009 | Tozawa et al. | 37/348 |
| 7,565,801 B2 * | 7/2009 | Tozawa et al. | 60/414 |
| 7,596,893 B2 * | 10/2009 | Tozawa et al. | 37/348 |
| 7,823,379 B2 * | 11/2010 | Hamkins et al. | 60/414 |
| 7,905,088 B2 * | 3/2011 | Stephenson et al. | 60/414 |
| 2008/0110165 A1 * | 5/2008 | Hamkins et al. | 60/414 |
| 2008/0110166 A1 * | 5/2008 | Stephenson et al. | 60/414 |
| 2008/0314038 A1 * | 12/2008 | Tozawa et al. | 60/414 |
| 2009/0036264 A1 * | 2/2009 | Tozawa et al. | 477/5 |
| 2009/0077837 A1 * | 3/2009 | Tozawa et al. | 37/361 |
| 2009/0199553 A1 * | 8/2009 | Nishimura et al. | 60/486 |
| 2009/0288408 A1 * | 11/2009 | Tozawa et al. | 60/435 |
| 2010/0064677 A1 * | 3/2010 | Kawaguchi et al. | 60/431 |
| 2010/0071973 A1 * | 3/2010 | Morinaga et al. | 180/65.265 |
| 2010/0076612 A1 * | 3/2010 | Robertson | 700/286 |
| 2011/0313608 A1 * | 12/2011 | Izumi et al. | 701/22 |
| 2012/0038327 A1 * | 2/2012 | Yokoyama | 320/166 |

FOREIGN PATENT DOCUMENTS

| | | |
|---|---|---|
| JP | 11-79655 A | 3/1999 |
| JP | 11-243603 | 9/1999 |
| JP | 2002-359935 | 12/2002 |
| JP | 2004-150306 | 5/2004 |
| JP | 2005-132534 A | 5/2005 |

OTHER PUBLICATIONS

Written Opinion issued in PCT/JP2008/055264, dated Apr. 22, 2008.
Decision of a Patent Grant for Japanese Patent Application No. 2009-506321 issued Apr. 26, 2012.

* cited by examiner

POWER GENERATION CONTROL METHOD OF HYBRID CONSTRUCTION MACHINE AND HYBRID CONSTRUCTION MACHINE

TECHNICAL FIELD

The present invention relates to a power generation control method of a hybrid construction machine provided with an engine and a generator motor coupled to each other as drive sources and with a swing motor for swinging a part of a body relative to other parts, and the hybrid construction machine.

BACKGROUND ART

Conventionally, in a hybrid vehicle provided with the engine and the generator motor coupled to each other as the drive sources, various approaches are made regarding power generation control of the generator motor at the time of operation.

For example, as a technique in the hybrid construction machine such as a hydraulic shovel provided with the swing motor for swinging a part of the vehicle relative to other parts, it is disclosed the technique to change a target power storage amount of a capacitor based on various energies of an operation machine to perform power generation control in order to obtain a small capacitor, which is a power storage device, and a longer operating life thereof (refer to patent document 1, for example).

It is difficult to estimate electric power consumed by the swing motor in the hybrid construction machine provided with the swing motor. This is because there are a variety of works and there is variation in lever operation by the operator. In the above-described conventional technique, the power generation control is performed substantially independently of the electric power consumed by the swing motor based on characteristics of such hybrid construction machine.

Patent Document 1: Japanese Laid-Open Patent Application Publication No. 2002-359935

DISCLOSURE OF INVENTION

Problem to be Solved by the Invention

However, there was a possibility that voltage of the capacitor rapidly increased and deviated from an appropriate range at the time of regeneration of the swing motor, when the power generation control was performed without sufficiently taking into account the electric power consumed by the swing motor. When the voltage of the capacitor deviates from the appropriate range, the system is rendered inoperative and the operating life of the capacitor becomes short. Therefore, it is considered to inhibit rapid increase in the voltage of the capacitor by increasing capacitance of the capacitor; however, the capacitor gets larger in this case and there was a problem of a space on which the capacitor is mounted, and weight and cost of the capacitor.

The present invention is made under above-described circumstances and an object thereof is to provide the power generation control method of the hybrid construction machine capable of maintaining the voltage of the capacitor in the appropriate range while minimizing the capacitance of the capacitor and of surely preventing the system from being rendered inoperative, and the hybrid construction machine.

Means for Solving Problem

According to an aspect of the present invention, a power generation control method of a hybrid construction machine provided with an engine and a generator motor coupled to each other, an inverter connected to the generator motor for driving the generator motor, a capacitor connected in parallel to the inverter for storing electric power generated by the generator motor and supplying electric power to the generator motor, and a swing motor supplied with electric power from the generator motor and the capacitor for swinging a part of a body relative to other parts, includes: a swing power calculating step of sequentially calculating swing power corresponding to electric power consumed by the swing motor; a swing power converting step of converting a value of the swing power at the time of power running of the swing motor calculated at the swing power calculating step to a smaller value; a power generation command generating step of sequentially generating a power generation command of the generator motor using the value converted at the swing power converting step; and an outputting step of outputting the power generation command generated at the power generation command generating step to the inverter.

Advantageously, in the power generation control method of the hybrid construction machine, the swing power converting step converts the value of the swing power such that, even when voltage of the capacitor changes at the time of regeneration of the swing motor, the voltage is within a predetermined range.

Advantageously, in the power generation control method of the hybrid construction machine, the swing power converting step carries out an operation of multiplying the value of the swing power by a coefficient smaller than 1.

Advantageously, in the power generation control method of the hybrid construction machine, the swing power converting step changes the coefficient to multiply the value of the swing power according to a predetermined measured value measured inside or outside the hybrid construction machine.

Advantageously, the power generation control method of the hybrid construction machine further includes: a target voltage setting step of setting target voltage of the capacitor according to a motor speed of the swing motor; a voltage difference calculating step for calculating difference between the target voltage set at the target voltage setting step and the voltage of the capacitor; and a voltage difference converting step for converting the voltage difference calculated at the voltage difference calculating step to a physical amount having same dimension as the swing power. The power generation command generating step calculates a sum of the value converted at the voltage difference converting step and the value converted at the swing power converting step, and generates the power generation command using the calculated sum.

According to another aspect of the present invention, a hybrid construction machine provided with an engine and a generator motor coupled to each other as drive sources and with a swing motor for swinging a part of a body relative to other parts, includes: an inverter connected to the generator motor for driving the generator motor; a capacitor connected in parallel to the inverter for storing electric power generated by the generator motor and supplying electric power to the generator motor; and a control unit for sequentially calculating swing power corresponding to electric power consumed by the swing motor, converting a value of the calculated swing power to a smaller value, sequentially generating a power generation command of the generator motor using the converted value, and outputting the generated power generation command to the inverter.

Advantageously, in the hybrid construction machine, the control unit sets target voltage of the capacitor according to a motor speed of the swing motor, calculates voltage difference between the set target voltage and voltage of the capacitor, converts the calculated voltage difference to a physical amount having same dimension as the swing power, and calculates a sum of a value obtained by converting the voltage difference and a value obtained by converting the swing power and generates the power generation command using the calculated sum.

Effect of the Invention

According to the present invention, the swing power corresponding to the electric power consumed by the swing motor is sequentially calculated, the calculated swing power is converted to a smaller value, the power generation command of the generator motor is sequentially generated using the converted value, and the generated power generation command is output to an inverter for the generator motor, so that the generator motor may generate power in consideration of energy to be returned from the swing motor at the time of regeneration. Therefore, it becomes possible to realize control within an operating voltage range in which the capacitor may offer performance thereof without unnecessarily increasing the capacitance of the capacitor, and it becomes possible to surely prevent the system from being rendered inoperative due to the deviation from the operating voltage range thereof or the like.

Figure 1:
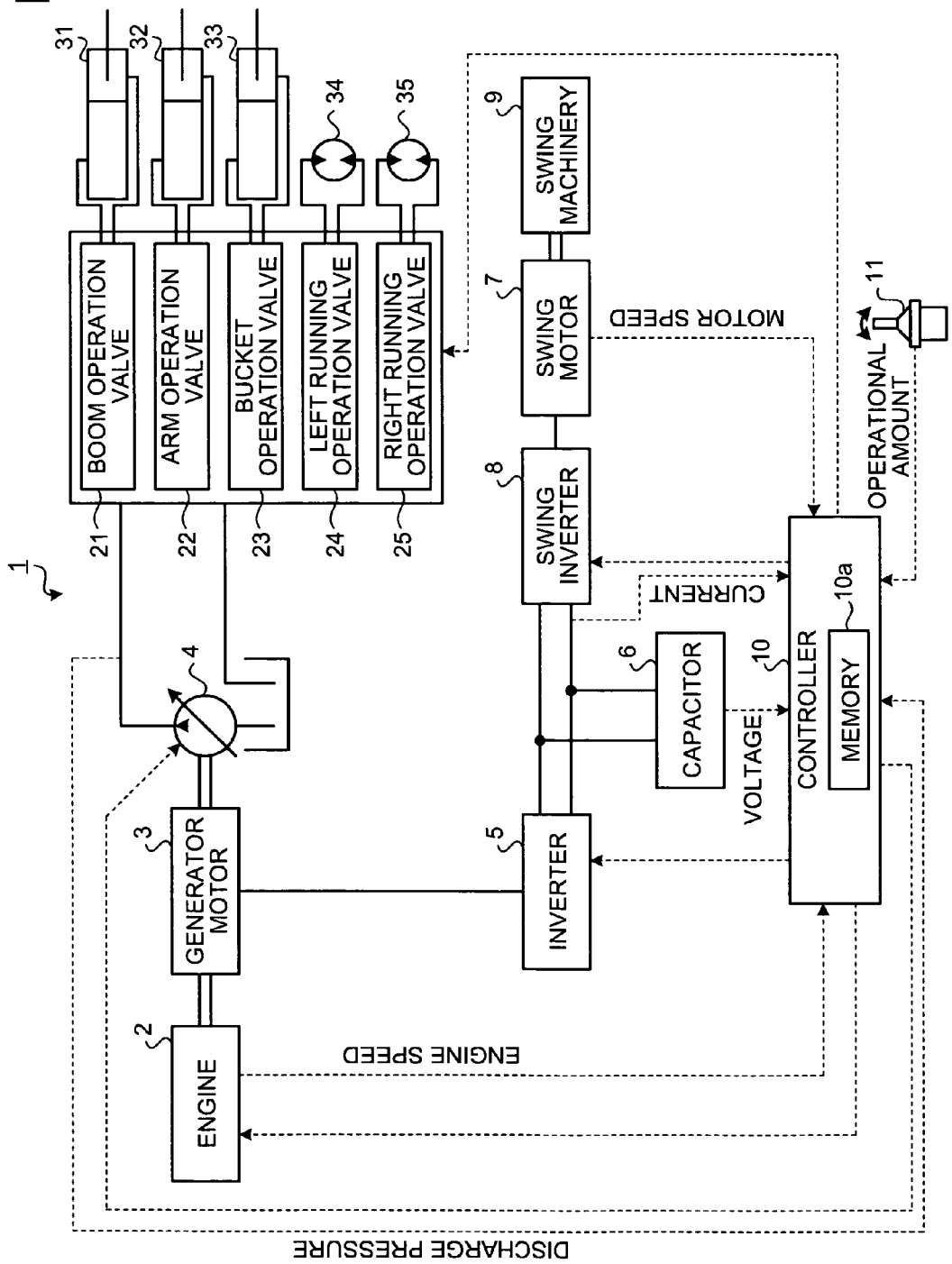
FIG. 1 is a view showing a configuration of a substantial part of a hybrid construction machine according to a first embodiment of the present invention.

EXPLANATIONS OF LETTERS OR NUMERALS 1 hydraulic shovel
2 engine
3 generator motor
4 hydraulic pump
5 inverter
6 capacitor
7 swing motor
8 swing inverter
9 swing machinery
10 controller
10a memory
11 operation input unit
21 boom operation valve
22 arm operation valve
23 bucket operation valve
24 left running operation valve
25 right running operation valve
31 boom hydraulic cylinder
32 arm hydraulic cylinder
33 bucket hydraulic cylinder
34 left running hydraulic cylinder
35 right running hydraulic cylinder
101 running body
102 swing body
103 boom
104 arm
105 bucket

BEST MODE(S) FOR CARRYING OUT THE INVENTION

Hereinafter, a best mode for carrying out the present invention (hereinafter, referred to as an "embodiment") is described with reference to attached drawings.

First Embodiment

FIG. 1 is a view showing a configuration of a substantial part of a hybrid construction machine according to a first embodiment of the present invention. The hybrid construction machine according to the first embodiment has an engine and a generator motor coupled to each other as drive sources, and has an electric swing function. Although a case of a hydraulic shovel having an excavation function is described as the hybrid construction machine in the first embodiment, this is no more than one example.

Figure 2:
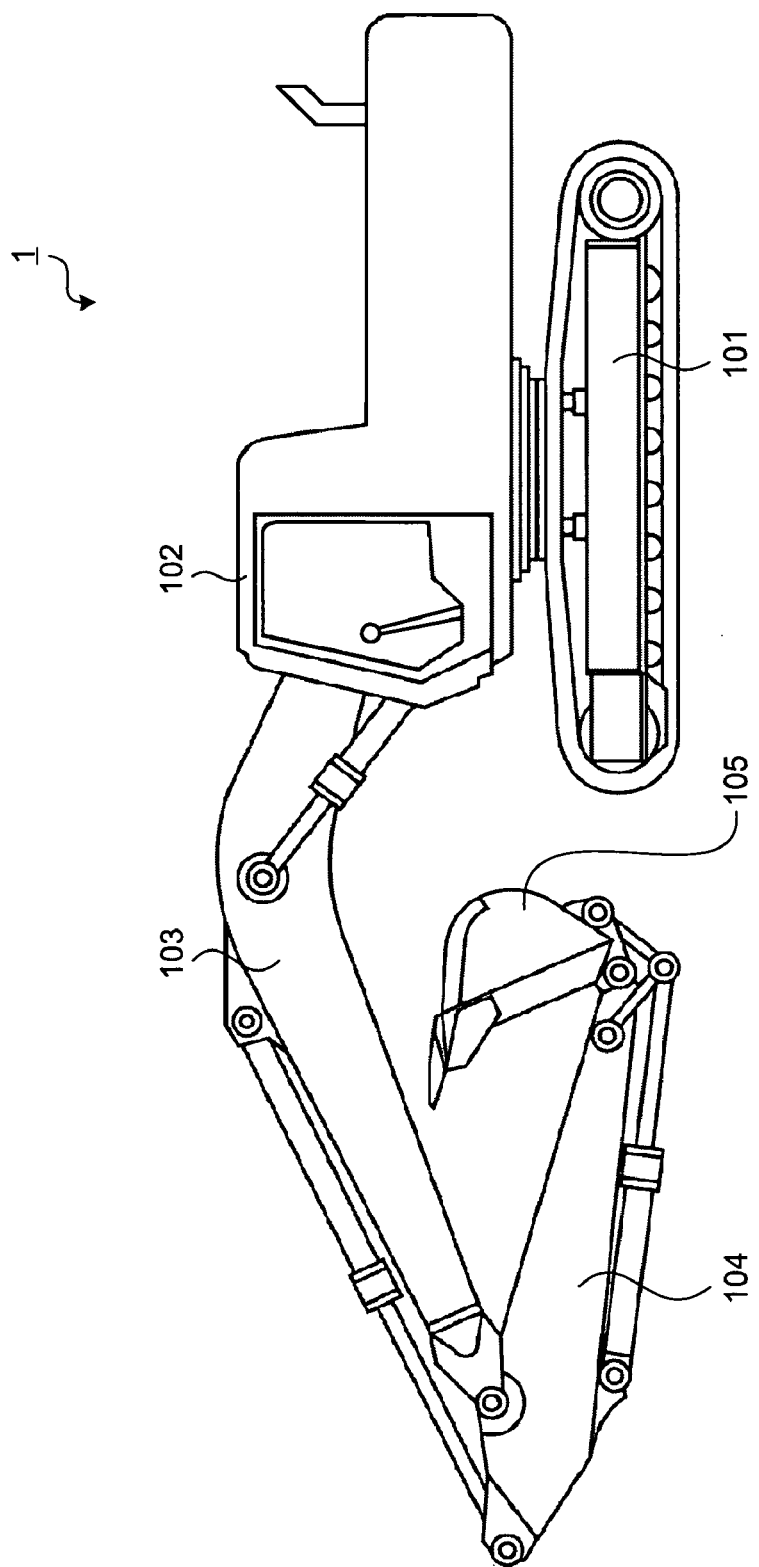
FIG. 2 is a view showing an external configuration of the hybrid construction machine according to the first embodiment of the present invention.

FIG. 2 is a view showing an external configuration of the hydraulic shovel, which is the hybrid construction machine. A hydraulic shovel 1 shown in the drawing is provided with a running body 101 having a right-and-left pair of crawler tracks, and a swing body 102 located above the running body 101 and pivotable about a swing axis oriented in a predetermined direction relative to the running body 101. In addition, the hydraulic shovel 1 has an operating machine for excavating composed of a boom 103, an arm 104 and a bucket 105. Out of them, the boom 103 is connected so as to be rotatable in an up and down direction relative to the running body 101.

Next, an internal configuration of the hydraulic shovel 1 is described with reference to FIG. 1. The hydraulic shovel 1 is provided with an engine 2, which is the drive source, a generator motor 3 and a hydraulic pump 4 each having a drive axis coupled to an output axis of the engine 2, an inverter 5 connected to the generator motor 3 to drive the generator motor 3, and a capacitor 6 connected in parallel to the inverter 5 to store electric power generated by the generator motor 3 and supply the electric power to the generator motor 3.

Also, the hydraulic shovel 1 is provided with a swing motor 7, which is the drive source for swinging the swing body 102, a swing inverter 8 connected in parallel to the capacitor 6 and connected in parallel to the inverter 5 for driving the swing motor 7, and swing machinery 9 coupled to a drive axis of the swing motor 7 for swinging the swing body 102.

Further, the hydraulic shovel 1 is provided with a controller 10 for electronically controlling the engine 2, the hydraulic pump 4, the inverter 5 and the swing inverter 8, and an operation input unit 11 composed of an operating lever or the like for an operator to input desired operation.

The hydraulic pump 4 is connected to various operation valves such as an boom operation valve 21, an arm operation valve 22, an bucket operation valve 23, a left running operation valve 24, and a right running operation valve 25, through piping. The hydraulic pump 4 is a variable displacement type, and capacity thereof changes due to a change in tilt angle of a tilted plate.

Pressurized oil discharged from the hydraulic pump 4 is supplied to a boom hydraulic cylinder 31, a arm hydraulic cylinder 32, a bucket hydraulic cylinder 33, a left running hydraulic cylinder 34 and a right running hydraulic cylinder 35, which serve as actuators, through the boom operation valve 21, the arm operation valve 22, the bucket operation valve 23, the left running operation valve 24, and the right running operation valve 25, respectively. This allows the boom 103, the arm 104, the bucket 105, the left crawler track and the right crawler track to operate.

The controller 10 receives input of a engine speed of the engine 2, discharge pressure of the hydraulic pump 4, voltage of the capacitor 6, direct-current electricity to be input to the swing inverter 8 (with a reversed sign at the time of output), a motor speed of the swing motor 7, and an operational amount of the operation input unit 11 by the operator, each measured by predetermined measuring means, and drive-controls the hydraulic shovel 1 based on the input of the various measured values. The various measured values are measured substantially in real time. The controller 10 has a memory 10a for storing a program for controlling various operations of the hydraulic shovel 1 and the above-described various measured values.

Figure 3:
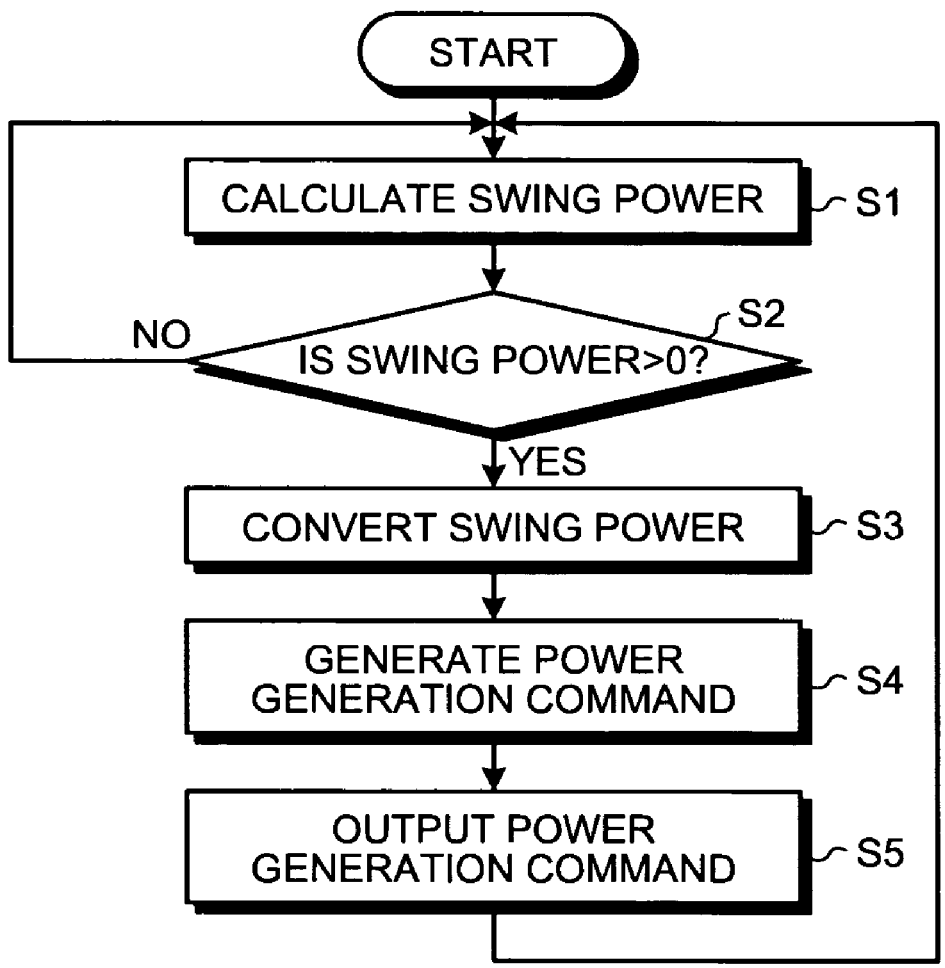
FIG. 3 is a flowchart showing an overview of a process of a power generation control method of the hybrid construction machine according to the first embodiment of the present invention.

FIG. 3 is a flowchart showing an overview of a process of a power generation control method of the hybrid construction machine according to the first embodiment.

First, the controller 10 calculates swing power consumed by the swing motor 7 (step S1). The controller 10 performs a process to be described later only when the swing power of the swing motor 7 is positive (at a time of power running) (step S2, Yes). When the swing power of the swing motor 7 is negative (at a time of regeneration) (step S2, No), the procedure returns to the step S1.

When the swing power calculated by the controller 10 is positive, the controller 10 reads a value of the swing power from the memory 10a, and converts the read value of the swing power to a smaller value (step S3). Next, the controller 10 generates a power generation command to the generator motor 3 using the converted swing power (step S4), and outputs the generated power generation command to the inverter 5 (step S5). Thereafter, the controller 10 returns to the step S1.

Figure 4:
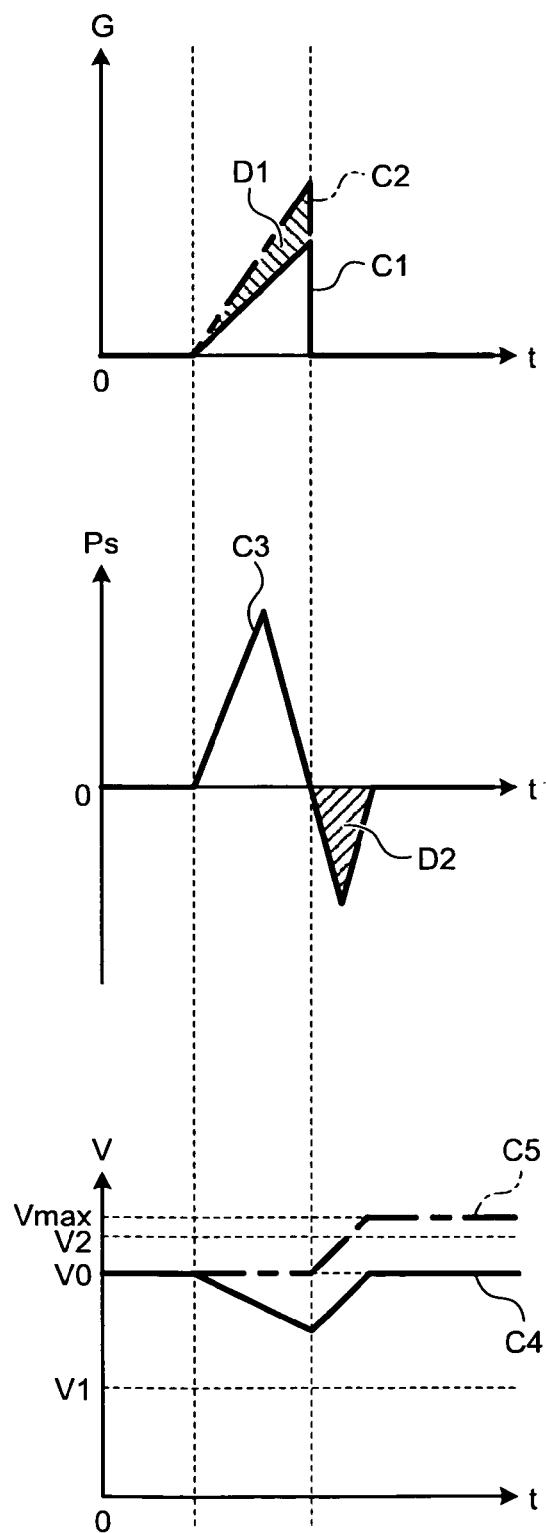
FIG. 4 is a view schematically showing the overview of the process of the power generation control method of the hybrid construction machine according to the first embodiment of the present invention.

FIG. 4 is a view schematically showing the overview of the process of the power generation control method of the hybrid construction machine described above. A curve C1 represents a change over time of an amount of power generation G generated by the generator motor 3 based on the power generation command output by the controller 10 at the step S5. In addition, a curve C2 represents the change over time of the amount of power generation G of the generator motor 3 controlled by a conventional power generation control method. That is to say, the curve C2 represents the change over time of the amount of power generation G generated by the generator motor 3 based on the power generation command output by the controller 10 when the process at the step S3 is not performed.

A curve C3 represents a change over time of swing power $P_S$ of the swing motor 7. In the curve C3, a range of $P_S>0$ corresponds to the time of power running of the swing motor 7, and a range of $P_S<0$ corresponds to the time of generation of the swing motor 7. A size of the swing power $P_S$ is determined according to the operational amount of the operating lever of the operation input unit 11 by the operator, and when the operating lever of the operation input unit 11 returns to an original position, the swing motor 7 performs regenerative operation. In general, the electric power consumed at the time of power running of the swing motor 7 is larger than the electric power generated at the time of regeneration of the swing motor 7.

A curve C4 represents a change over time of capacitor voltage V of the capacitor 6 in a case in which the amount of power generation G of the generator power 3 changes over time according to the curve C1 and which the swing power $P_S$ of the swing motor 7 changes over time according to the curve C3. Also, a curve C5 represents the change over time of the capacitor voltage V in a case in which the amount of power generation G of the generator motor 3 changes over time according to the curve C2 and which the swing power $P_S$ of the swing motor 7 changes over time according to the curve C3. In FIG. 4, an operating voltage range in which the capacitor 6 may offer performance thereof is set to (V1, V2).

In the first embodiment, in order to supply the swing power $P_S$ consumed at the time of power running of the swing motor 7, the electric power generated by the generator motor 3 is not sufficient and the electric power from the capacitor 6 is also required. Therefore, the capacitor voltage V decreases at the time of power running of the swing motor 7. On the other hand, the electric power is returned from the swing motor 7 to the capacitor 6 at the time of regeneration of the swing motor 7, so that an electric charge amount of the capacitor 6 increases and the capacitor voltage V increases.

It is preferable that the controller 10 controls such that energy obtained by temporally integrating a decrease in the amount of power generation G (area of a range D1 enclosed by the curves C1 and C2) substantially equals to energy obtained by temporally integrating the electric power generated at the time of regeneration of the swing motor 7 (area of a range D2 enclosed by the curve C3 and a t-axis). Since the energy corresponding to the decrease in the amount of power generation G equals to the energy supplied by the capacitor 6 at the time of power running of the swing motor 7, by performing the above-described control, the energy supplied by the capacitor 6 at the time of power running of the swing motor 7 substantially equals to the energy returned to the capacitor 6 at the time of regeneration of the swing motor 7. Therefore, the capacitor voltage V is substantially the same before and after the generation of the swing power $P_S$ by the swing motor 7 (V0 in FIG. 4).

Herein, the conventional power generation control method is described for comparison. In a case of the conventional power generation control method, it is not necessary that the capacitor 6 supply the electric power at the time of power running of the swing motor 7. Therefore, the capacitor voltage V is constant at the time of power running of the swing motor 7. Also, since the electric power is returned from the swing motor 7 to the capacitor 6 at the time of regeneration of the swing motor 7, the capacitor voltage V increases from a value V0 before generation of the swing power $P_S$ by the swing motor 7. In the curve C5 shown in FIG. 4, a maximum value Vmax of the capacitor voltage V is higher than an upper limit value V2 of the operating voltage range of the capacitor 6.

In this manner, in the conventional power generation control method, there has been a case in which the capacitor voltage V deviated from the operating voltage range of the capacitor 6 and the system was rendered inoperative. On the other hand, according to the first embodiment, when supplying the electric power to the swing motor 7, the amount of power generation of the generator motor 3 is decreased and the decrease is compensated by the supply from the capacitor 6, so that it is possible to always maintain the capacitor voltage V in an operable range. Therefore, stable system operation may be realized.

Figure 5:
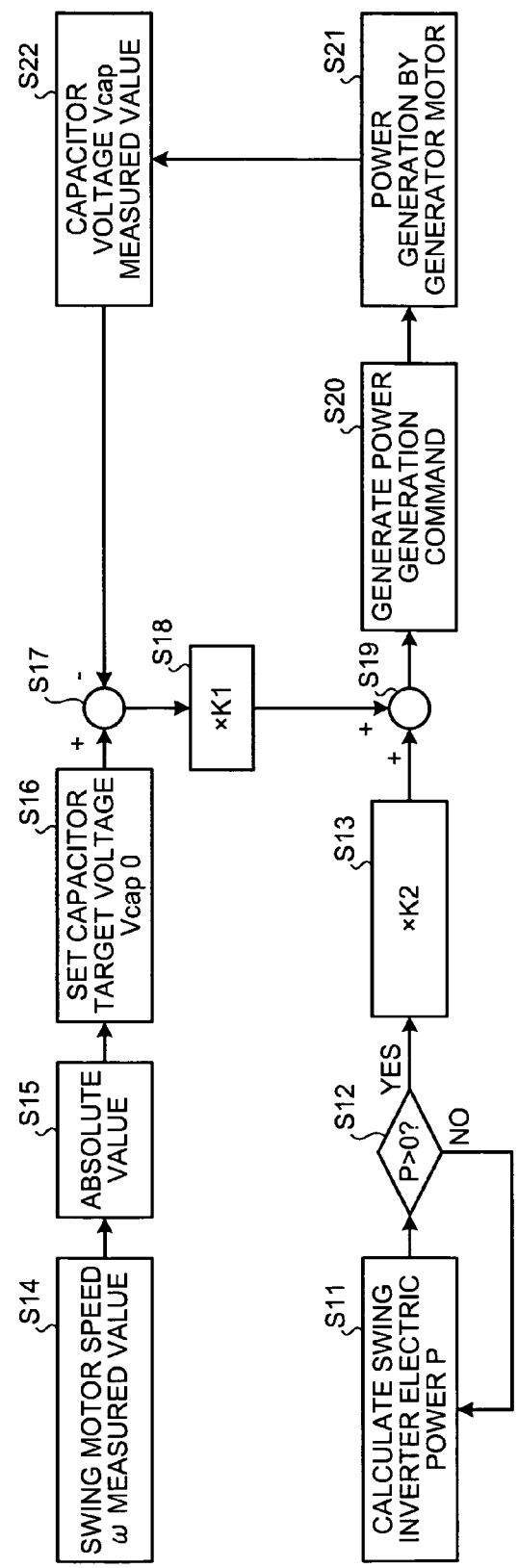
FIG. 5 is a process flow diagram showing an overview of a more detailed process of the power generation control method of the hybrid construction machine according to the first embodiment of the present invention.
Figure 6:
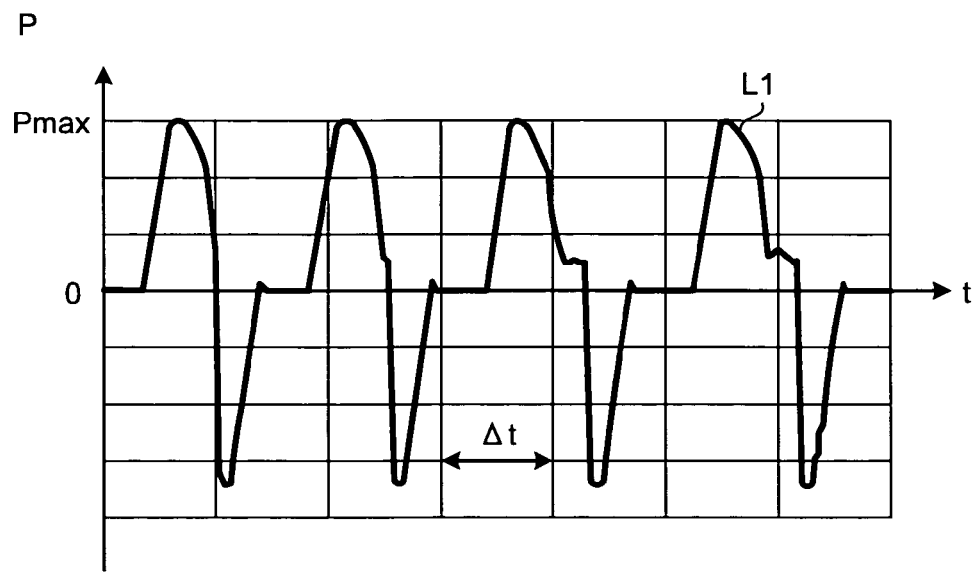
FIG. 6 is a view showing an example of a change over time of swing inverter electric power.

FIG. 5 is a process flow diagram showing an overview of a more detailed process of the power generation control method of the hybrid construction machine described with reference to FIGS. 3 and 4. The controller 10 sequentially calculates the electric power of the swing inverter 8 (swing inverter electric power P) as the swing power consumed by the swing motor 7 to store in the memory 10*a* (step S11). The swing inverter electric power P is calculated by multiplying the measured value of the voltage of the capacitor 6 by the measured value of the direct-current electricity input to the swing inverter 8. FIG. 6 is a view showing an example of a change over time of the swing inverter electric power P when the operator carries out certain operation (hereinafter, referred to as "operation A"). A curve L1 shown in FIG. 6 varies while repeating the power running (P>0) and the regeneration (P<0), and the maximum value at the time of power running is Pmax.

Thereafter, the controller 10 performs a process to be described later only when the swing inverter electric power P is positive, that is to say, at the time of power running (step S12, Yes). When the swing inverter electric power P is negative, that is to say, at the time of regeneration (step S12, No), the procedure returns to the step S11.

When the swing inverter electric power P is positive, the controller 10 carries out an operation of multiplying the swing inverter electric power P by a predetermined coefficient K2 (step S13). The coefficient K2 is a constant smaller than 1 and a specific value thereof is set while taking into account the electric power returned to the capacitor 6 by the power generation by the swing motor 7 at the time of regeneration of the swing motor 7 (corresponding to a range of P<0 in FIG. 6). However, it is physically substantially impossible that the swing motor 7 returns the electric power, which is larger than that at the time of power running, to the capacitor 6 at the time of regeneration, so that it is necessary that the coefficient K2 be a value not smaller than 0. Meanwhile, the operation giving a value smaller than the swing inverter electric power P may be used as the operation at the step S13, and it is possible to subtract a predetermined constant from the swing inverter electric power P, for example.

Figure 7:
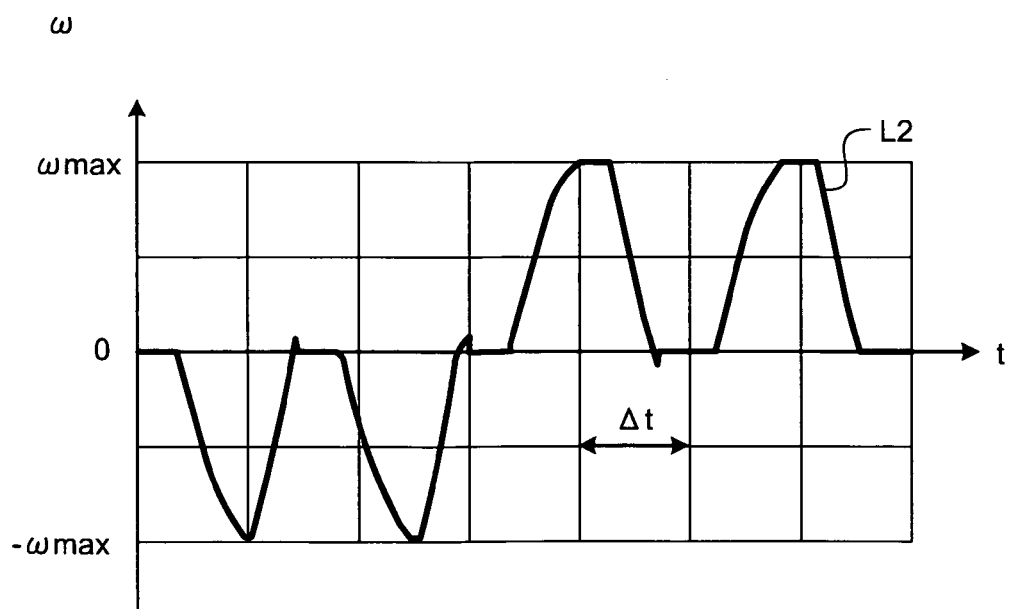
FIG. 7 is a view showing an example of a change over time of a swing motor speed.

The controller 10 also receives the motor speed of the swing motor 7 (swing motor speed $\omega$) in real time (step S14). FIG. 7 is a view showing an example of a change over time of the swing motor speed $\omega$. A curve L2 shown in FIG. 7 corresponds to the swing inverter electric power P shown in FIG. 6, and represents the change over time in the same time period as in FIG. 6 in which the operator carries out the operation A. In such curve L2, the swing motor 7 rotates according to a swing direction with a maximum motor speed of $\omega$max. The rotation of the swing motor 7 changes according to the lever operation carried out by the operator in the operation input unit 11. That is to say, the change over time shown in FIG. 7 is that when the operator carries out certain lever operation.

Next, the controller 10 takes an absolute value of the swing motor speed $\omega$ (step S15), and sets target voltage Vcap0 of the capacitor 6 according to this value (step S16).

Figure 8:
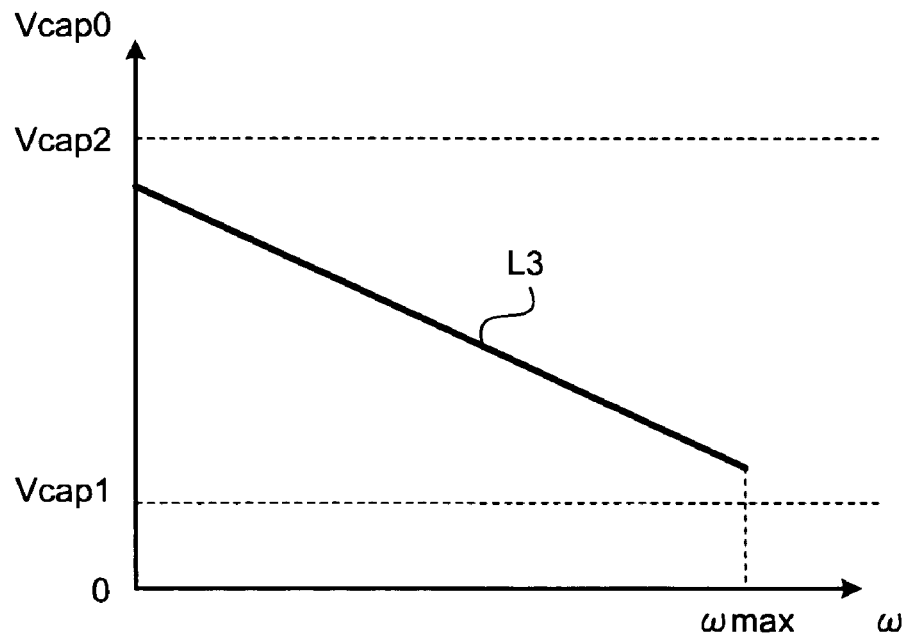
FIG. 8 is a view showing a relationship between an absolute value of the swing motor speed and capacitor target voltage.

FIG. 8 is a view showing a relationship between (the absolute value of) the swing motor speed $\omega$ and the capacitor target voltage Vcap0. In general, the capacitor 6 has the operating voltage range in which this may offer the performance thereof. Therefore, it is preferable that the capacitor target voltage Vcap0 is set to be included in the operating voltage range regardless of the value of the swing motor speed $\omega$. In addition, it is considered that the energy returned at the time of regeneration of the swing motor 7 is larger with increasing absolute value of the swing motor speed $\omega$, so that it is more preferable that the capacitor target voltage Vcap0 is set to be lower with increasing absolute value of the swing motor speed $\omega$, to leave place to store the energy.

A straight line L3 shown in FIG. 8 is set such that the relationship between the swing motor speed $\omega$ and the capacitor target voltage Vcap0 satisfies the above-described two characteristics. In FIG. 8, the operating voltage range of the capacitor 6 is set to (Vcap1, Vcap2). In addition, in FIG. 8, it is also possible to set the range of the value of the capacitor target voltage Vcap0 narrower than the operating voltage range (Vcap1, Vcap2) in consideration of a case in which the controller 10 performs another control.

Meanwhile, it is not necessary that the relationship between the swing motor speed $\omega$ and the capacitor target voltage Vcap0 be necessarily linear as long as this at least satisfies the above-described two characteristics. Also, it is possible to make the capacitor target voltage Vcap0 constant regardless of the swing motor speed $\omega$.

Following the step S16, the controller 10 calculates difference Vcap0−Vcap between the set capacitor target voltage Vcap0 and the voltage Vcap of the capacitor 6 received in real time (step S17), and multiplies the difference by a coefficient K1 (step S18). Herein, the coefficient K1 is a predetermined constant, which is the coefficient to convert the voltage difference Vcap0−Vcap obtained at the step S17 to an electric power value (dimension of the swing inverter electric power P), and has physical dimension (herein, dimension of current) unlike the above-described coefficient K2. Meanwhile, the physical dimension of K1 may be dimension of the capacitor capacitance or dimension of multiplication of the current and the capacitor.

The controller 10 obtains a sum of P×K2 obtained at the step S13 and (Vcap0−Vcap)×K1 obtained at the step S18 (step S19), and generates the power generation command to be output to the inverter 5 using the sum (step S20). At the step S20, the controller 10 generates the power generation command only when the output at the step S19 is positive, and outputs power generation capacity of the generator motor 3 as the power generation command when the generated power generation command excesses the power generation capacity of the generation motor 3. Also, at the step S20, a filter of a predetermined frequency may be interposed.

In a value of the sum obtained at the step S19, P×K2 is basically dominant, and it is set that a contribution of (Vcap0−Vcap)×K1 increases when the hydraulic shovel 1 performs unusual operation. Specifically, there is a tendency that the value of Vcap0−Vcap is larger at the time of unusual operation than at the time of normal operation. As the unusual operation herein used, a case in which the bucket 105 suddenly collides with something to stop, for example, is considered. When the bucket 105 suddenly stops due to an external cause, the swing motor speed ω suddenly becomes 0, so that the capacitor target voltage Vcap0 suddenly becomes large (refer to FIG. 8). As a result, the difference Vcap0−Vcap between the same and the capacitor voltage Vcap becomes large and a ratio of the contribution of (Vcap0−Vcap)×K1 in the sum obtained at the step S19 increases.

After that, the controller 10 outputs the generated power generation command to the inverter 5. The inverter 5 drives the generator motor 3 according to the input power generation command. This allows the generator motor 3 to generate electric power (step S21).

According to the power generation by the generator motor 3, the capacitor voltage Vcap changes over time. As described above, the controller 10 receives the measured value of the capacitor voltage Vcap substantially in real time (step S22). Therefore, the change in the capacitor voltage Vcap by the power generation by the generator motor 3 is transmitted to the controller 10 substantially in real time.

Figure 9:
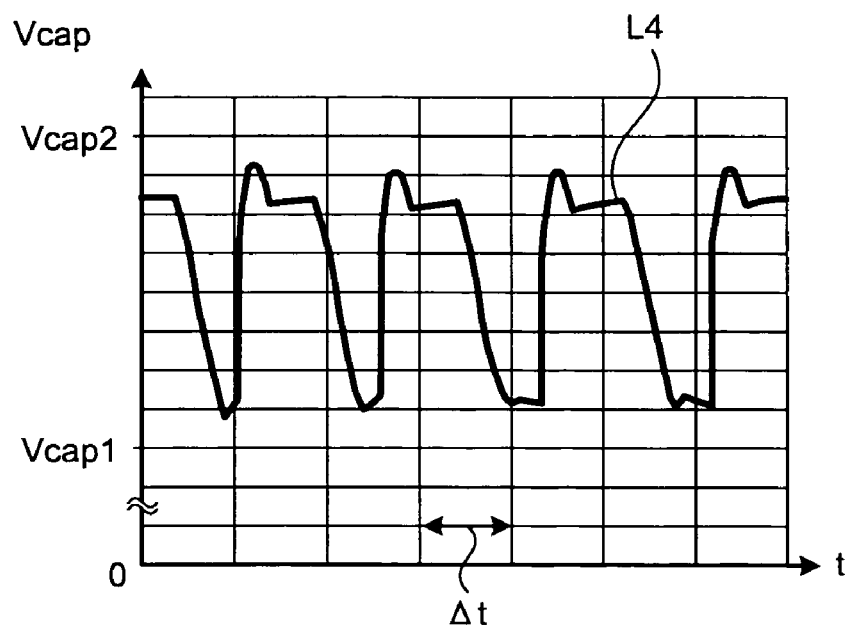
FIG. 9 is a view showing an example of a change over time of capacitor voltage.

FIG. 9 is a view showing an example of a change over time of the capacitor voltage Vcap. A curve L4 shown in FIG. 9 corresponds to the swing inverter electric power P shown in FIG. 6 and the swing motor speed ω shown in FIG. 7, and represents the change over time in the same time period as in FIGS. 6 and 7 in which the operator carries out the operation A. The curve L4 always varies within the operating voltage range without deviating from the operating voltage range (Vcap1, Vcap2) of the capacitor 6. As is clear from this, according to the power generation control method of the hybrid construction machine according to the first embodiment, it is possible to maintain the voltage of the capacitor 6 in an appropriate range.

Meanwhile, as described in the above-described step S17, the controller 10 sequentially uses the measured value of the capacitor voltage Vcap when calculating the voltage difference between the capacitor voltage Vcap and the capacitor target voltage Vcap0.

According to the above-described first embodiment of the present invention, the swing power (swing inverter electric power) corresponding to the electric power consumed by the swing motor is sequentially calculated, the calculated swing power is converted to the smaller value, the power generation command of the generator motor is sequentially generated using the converted value, and the generated power generation command is output to the inverter for the generator motor, so that the generator motor may generate power in consideration of the energy to be returned from the swing motor at the time of regeneration. Therefore, it becomes possible to realize the control of the capacitor within the operating voltage range without unnecessarily increasing the capacitance of the capacitor, and it becomes possible to surely prevent the system failure due to the deviation of the capacitor from the operating voltage range.

Also, according to the first embodiment, the swing power corresponding to the power consumed by the swing motor is sequentially calculated, the calculated swing power is converted to the smaller value, the power generation command of the generator motor is sequentially generated using the converted value, and the generated power generation command is output to the inverter for the generator motor, so that the generator motor may generate power in consideration of the energy to be returned from the swing motor at the time of regeneration. Therefore, it becomes possible to realize the control within the operating voltage range in which the capacitor may offer performance thereof without unnecessarily increasing the capacitance of the capacitor, and it becomes possible to surely prevent the system from being rendered inoperative due to deviation from the operating voltage range thereof or the like.

Meanwhile, although the swing inverter electric power is used as the swing power in the first embodiment, torque and the motor speed of the swing motor may be used instead, or an operational amount of the operation input unit (lever stroke) may be used.

Second Embodiment

Figure 10:
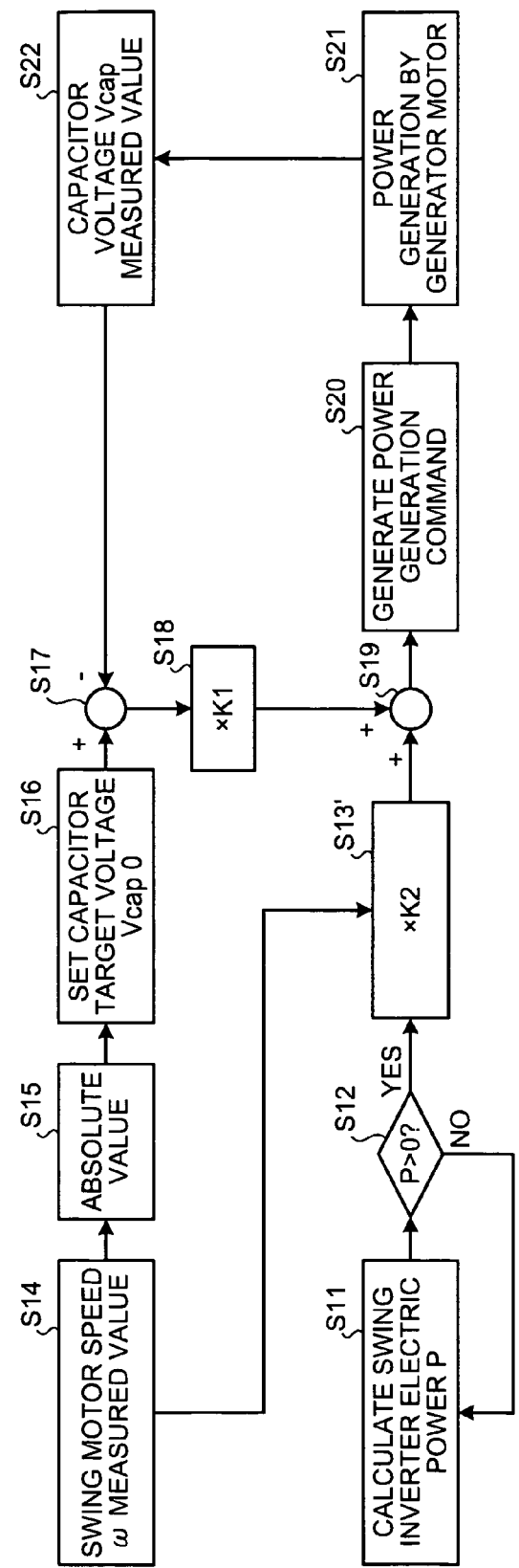
FIG. 10 is a process flow diagram showing an overview of a process of the power generation control method of the hybrid construction machine according to a second embodiment of the present invention.

FIG. 10 is a process flow diagram showing an overview of a process of the power generation control method of the hybrid construction machine according to a second embodiment of the present invention. In the second embodiment, the value of the coefficient K2 is changed according to the motor speed ω of the swing motor 7 when the controller 10 carries out the operation of multiplying the swing inverter electric power P by the predetermined coefficient K2 (step S13').

Figure 11:
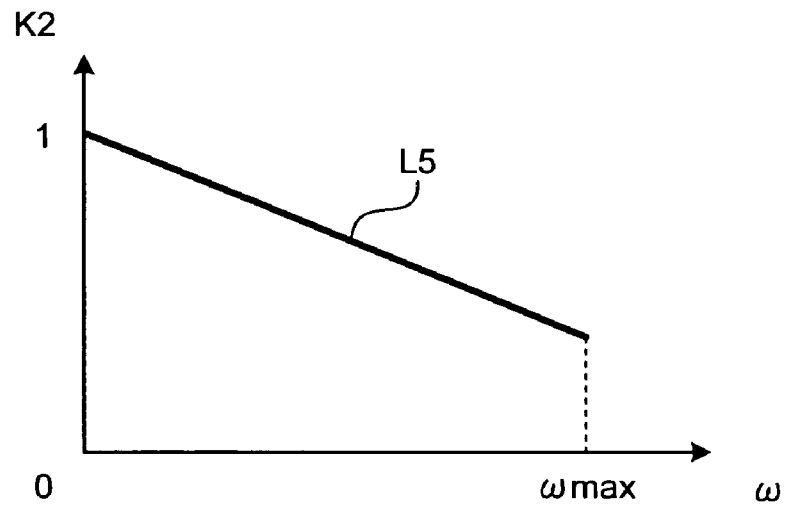
FIG. 11 is a view showing a relationship between a coefficient and the swing motor speed in a case of changing the coefficient to be multiplied by swing power output according to the swing motor speed.

FIG. 11 is a view showing a relationship between the motor speed ω of the swing motor 7 and the coefficient K2. In a straight line L5 shown in FIG. 11, the coefficient K2 gets smaller as the motor speed ω of the swing motor 7 gets larger. The coefficient K2 is thus set because the larger the swing motor speed ω is, the smaller the amount of power generation by the generator motor 3 may be.

The configuration of the hybrid construction machine and the process of the power generation control method of the hybrid construction machine except the above-described points are the same as those of the above-described first embodiment.

Another Embodiment

Figure 12:
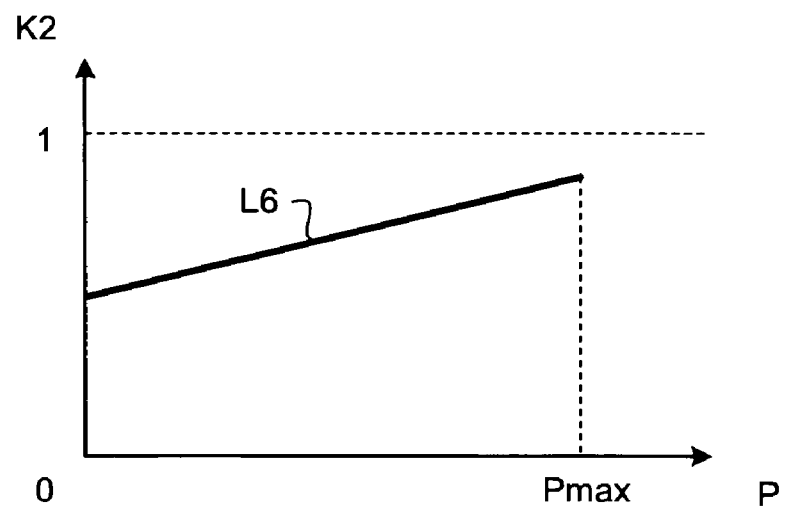
FIG. 12 is a view showing a relationship between the coefficient and the swing inverter electric power in a case of changing the coefficient to be multiplied by the swing power output according to the swing inverter electric power.

Although the best mode for carrying out the invention is described so far, the present invention is not limited only by the above-described two embodiments. FIG. 12 is a view showing another setting example of the coefficient K2 to be multiplied by the swing inverter output (swing power). A straight line L6 shown in the drawing represents a case in which the coefficient K2 is changed according to the swing inverter electric power P(>0). In this case, it is necessary to increase the amount of power generation of the generator motor 3 with increasing swing inverter power P, so that it is configured that the value of the coefficient K2 increases with increasing swing inverter electric power P.

Figure 13:
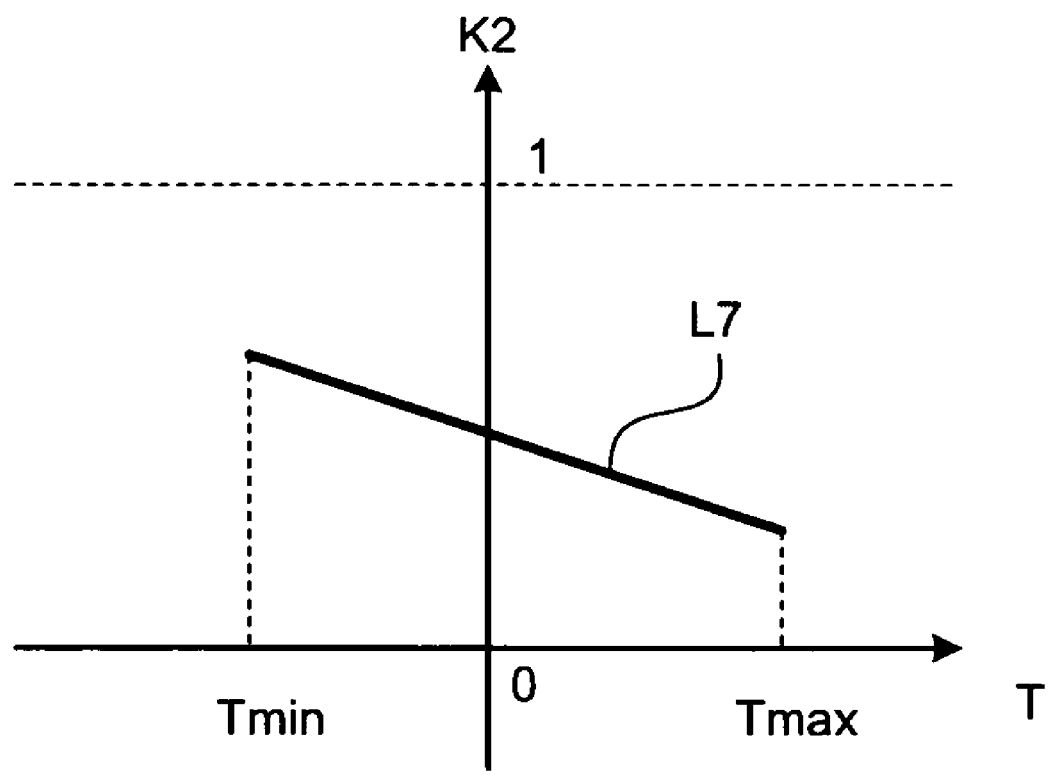
FIG. 13 is a view showing a relationship between the coefficient and an external temperature in a case of changing the coefficient to be multiplied by the swing power output according to the external temperature.

FIG. 13 is a view showing yet another setting example of the coefficient K2 to be multiplied by the swing inverter output (swing power). A straight line L7 shown in the drawing represents a case in which the coefficient K2 is changed according to an exterior temperature T (centigrade temperature is supposed in FIG. 13). The construction machine is supposed to be used in a wide temperature range from a low temperature of 0 degrees C. or lower to a high temperature (Tmim to Tmax). In general, efficiency of the generator motor 3 increases with increasing exterior temperature T, so that the higher the exterior temperature T is, the smaller the coefficient K2 may be made. Meanwhile, an internal temperature of the capacitor may be used in place of the exterior temperature T.

Although only a case in which the relationship between the coefficient K2 and various conditions is linearly changed is described in the above description, the change may be set by an appropriate function.

Also, the value of the coefficient K1 to be multiplied by the voltage difference between the capacitor target voltage Vcap0 and the capacitor voltage Vcap may be made variable. For example, it may be configured that the controller 10 performs control to change the value of the coefficient K1, when a time period in which the contribution of (Vcap0−Vcap)×K1 is larger than a predetermined reference value in the sum obtained at the step S19 in FIG. 5 continues for predetermined time. Also, it is possible to convert the voltage difference Vcap0−Vcap by an appropriate function to output, instead of multiplying the coefficient K1.

In this manner, the present invention may include various embodiments not described herein, and it is possible to make various design changes or the like without departing from the scope of technical idea specified by claims.

INDUSTRIAL APPLICABILITY

As described above, the present invention is useful in controlling the power generation of the hybrid construction machine provided with the capacitor as a power storage device and the swing motor.

The invention claimed is:

1. A power generation control method of a hybrid construction machine provided with an engine and a generator motor coupled to each other, an inverter connected to the generator motor for driving the generator motor, a swing motor for swinging a part of a body relative to other parts, a swing inverter connected to the swing motor for driving the swing motor, and a capacitor connected in parallel to the inverter and the swing inverter respectively for storing electric power generated by the generator motor and the swing motor and supplying electric power to the generator motor and the swing motor, the method comprising:
a swing power calculating step of sequentially calculating swing power corresponding to electric power consumed by the swing motor;
a swing power converting step of converting a value of the swing power at the time of power running of the swing motor calculated at the swing power calculating step to a smaller value;
a power generation command generating step of sequentially generating a power generation command of the generator motor using the value converted at the swing power converting step; and
an outputting step of outputting the power generation command generated at the power generation command generating step to the inverter, wherein
a swing power of the swing motor at the power running is supplied from the generator motor and the capacitor.

2. The power generation control method of the hybrid construction machine according to claim 1, wherein
the swing power converting step converts the value of the swing power such that, even when voltage of the capacitor changes at the time of regeneration of the swing motor, the voltage is within a predetermined range.

3. The power generation control method of the hybrid construction machine according to claim 1, wherein
the swing power converting step carries out an operation of multiplying the value of the swing power by a coefficient smaller than 1.

4. The power generation control method of the hybrid construction machine according to claim 3, wherein
the swing power converting step changes the coefficient to multiply the value of the swing power according to a predetermined measured value measured inside or outside the hybrid construction machine.

5. The power generation control method of the hybrid construction machine according to claim 1, further comprising:
a target voltage setting step of setting target voltage of the capacitor according to a motor speed of the swing motor;
a voltage difference calculating step for calculating difference between the target voltage set at the target voltage setting step and the voltage of the capacitor; and
a voltage difference converting step for converting the voltage difference calculated at the voltage difference calculating step to a physical amount having same dimension as the swing power, wherein
the power generation command generating step calculates a sum of the value converted at the voltage difference converting step and the value converted at the swing power converting step, and generates the power generation command using the calculated sum.

6. A hybrid construction machine provided with an engine and a generator motor coupled to each other as drive sources and with a swing motor for swinging a part of a body relative to other parts, the hybrid construction machine comprising:
an inverter connected to the generator motor for driving the generator motor;
a swing inverter connected to the swing motor for driving the swing motor;
a capacitor connected in parallel to the inverter and the swing inverter respectively for storing electric power generated by the generator motor and the swing motor and supplying electric power to the generator motor and the swing motor; and
a control unit for sequentially calculating swing power corresponding to electric power consumed by the swing motor, converting a value of the calculated swing power to a smaller value, sequentially generating a power generation command of the generator motor using the converted value, and outputting the generated power generation command to the inverter, wherein
a swing power of the swing motor at a power running is supplied from the generator motor and the capacitor.

7. The hybrid construction machine according to claim 6, wherein
the control unit sets target voltage of the capacitor according to a motor speed of the swing motor,
calculates voltage difference between the set target voltage and voltage of the capacitor,
converts the calculated voltage difference to a physical amount having same dimension as the swing power, and
calculates a sum of a value obtained by converting the voltage difference and a value obtained by converting the swing power and generates the power generation command using the calculated sum.

* * * * *